United States Patent [19]

Momose et al.

[11] Patent Number: 4,901,369

[45] Date of Patent: Feb. 13, 1990

[54] MICROWAVE TRANSMITTER/RECEIVER APPARATUS

[75] Inventors: Masao Momose; Kazuo Kosukegawa; Noriyuki Asari; Hirohisa Ozawa; Yuhei Kosugi; Osamu Yamamoto, all of Tokyo, Japan

[73] Assignee: NEC Corporation, Tokyo, Japan

[21] Appl. No.: 267,642

[22] Filed: Nov. 3, 1988

Related U.S. Application Data

[63] Continuation of Ser. No. 831,667, Feb. 19, 1986, abandoned.

[30] Foreign Application Priority Data

Feb. 22, 1985 [JP] Japan .............................. 60-24510[U]
Jan. 31, 1986 [JP] Japan .............................. 61-20681

[51] Int. Cl.[4] .............................. H04B 1/40

[52] U.S. Cl. .............................. 455/84; 342/361; 343/775; 343/872

[58] Field of Search .............................. 455/73, 81-83, 455/90, 129, 151, 83, 84, 12, 89; 342/361, 78, 425; 343/761, 763, 872, 840, 765, 775, 762; 333/212, 208

[56] References Cited

U.S. PATENT DOCUMENTS

| | | | |
|---|---|---|---|
| 2,803,817 | 8/1957 | Marasco et al. | 455/81 |
| 2,956,277 | 10/1960 | Crawford | 455/73 |
| 3,827,051 | 7/1974 | Foldes | 455/81 |
| 4,147,980 | 4/1979 | Rook | 455/81 |
| 4,260,967 | 4/1981 | Flieger | 333/208 |
| 4,397,035 | 8/1983 | Nothnagel et al. | 455/81 |
| 4,538,175 | 8/1985 | Balbes et al. | 455/151 |

FOREIGN PATENT DOCUMENTS 0073511 9/1987 European Pat. Off. .

*Primary Examiner*—Robert L. Griffin
*Assistant Examiner*—Curtis Kuntz
*Attorney, Agent, or Firm*—Laff, Whitesel, Conte & Saret

[57] ABSTRACT

The invention eliminates polarization problems and feeder waveguide loss in a miniature microwave transmitter/receiver. This is done by providing a massive heat sink, metal housing with a primary radiator which is rotatably mounted on the end of the housing. Polarization is accomplished by rotating the radiator on the housing. Inside the housing there is a hybrid of integrated circuits mounted on internal parts of the housing which provide both heat sinking and waveguide functions.

31 Claims, 8 Drawing Sheets

MICROWAVE TRANSMITTER/RECEIVER APPARATUS

This application is a continuation of application Ser. No. 06/831,667, filed Feb. 19, 1986, abandoned.

BACKGROUND OF THE INVENTION

The present invention relates to a microwave transmitter/receiver apparatus applicable to terrestrial communication, satellite communication and other forms of communication. More particularly, the invention relates to a transmitter/receiver apparatus which is small in size and which allows the polarization plane of a polarized wave to be adjusted.

In a microwave communication system having a relatively small capacity, a communication apparatus usually comprises an antenna, a primary radiator, a transmit/receive multiplexer, a transmitter, a receiver, and other units. The transmitter and the receiver, which are discrete units, are connected to the transmit/receive multiplexer by a waveguide. The multiplexer, in turn, is connected to the primary radiator, or horn, by a feeder waveguide. The transmitter and the receiver are sometimes accommodated in a single housing.

In such a construction, the prerequisite is that the polarization plane of a polarized wave be aligned with the polarization plane of the horn in order to increase the signal-to-noise (SN) ratio of transmit and receive signals. One approach for fulfilling this requirement which is known in the art is to make the horn, transmit/-receive multiplexer, transmitter, receiver and feeder waveguide rotatable. As discussed later in detail, the problem with this approach is that a polarization adjusting mechanism becomes complicated and expensive. Since the loss of the feeder waveguide is increased, the transmit output has to be made greater thereby increasing both the power consumption and the dimensions of the apparatus.

Another prior art approach is inserting a polarizer between the transmit/receive multiplexer and the horn. The polarizer scheme, however, adds to the cost due to the use of a polarizer and brings about a feed loss due to the use of the feeder waveguide. The feed loss of the waveguide invites the same disadvantages that occurs in th first-mentioned approach. Further, since both of these prior art approaches interconnect the circuits using a feeder waveguide, they cannot be implemented without increasing the overall apparatus scale and furnishing each junction with an air- and liquid-tight structure. These prior art approaches result in prohibitively long assembling and adjusting time.

SUMMARY OF THE INVENTION

It is, therefore, an object of the present invention to provide a miniaturized microwave transmitter/receiver apparatus.

It is another object of the present invention to provide a microwave transmitter/receiver apparatus which allows the polarization angle of a primary reflector to be readily matched to the polarization plane of a polarized wave.

A microwave transmitter/receiver apparatus of the present invention comprises a housing, a primary radiator, a transmit/receive multiplexer for multiplexing a transmit signal and a receive signal, a transmit filter and a receive filter connected respectively to a transmit input and a receive input of the transmit/receive multiplexer. Transmit means are connected to the transmit filter for outputting the transmit signal by receiving a predetermined transmit intermediate frequency (IF) signal. Receive means are connected to the receive filter for outputting a predetermined IF signal by receiving the receive signal. The multiplexer, the transmit and the receive filters, the transmit means, and the receive means are accommodated in the housing. The primary radiator may be mounted in an opening of the housing which is adapted for wave radiation. At least the multiplexer may be provided as a waveguide circuit in the housing. The apparatus may further comprise support means for rotatably supporting the housing to turn about a wave radiation axis of the housing.

BRIEF DESCRIPTION OF THE DRAWINGS

The above objects, features and advantages of the present invention will become more apparent from the following detailed description taken with reference to the accompanying drawings in which.

DETAILED DESCRIPTION OF THE INVENTION

Figure 1:
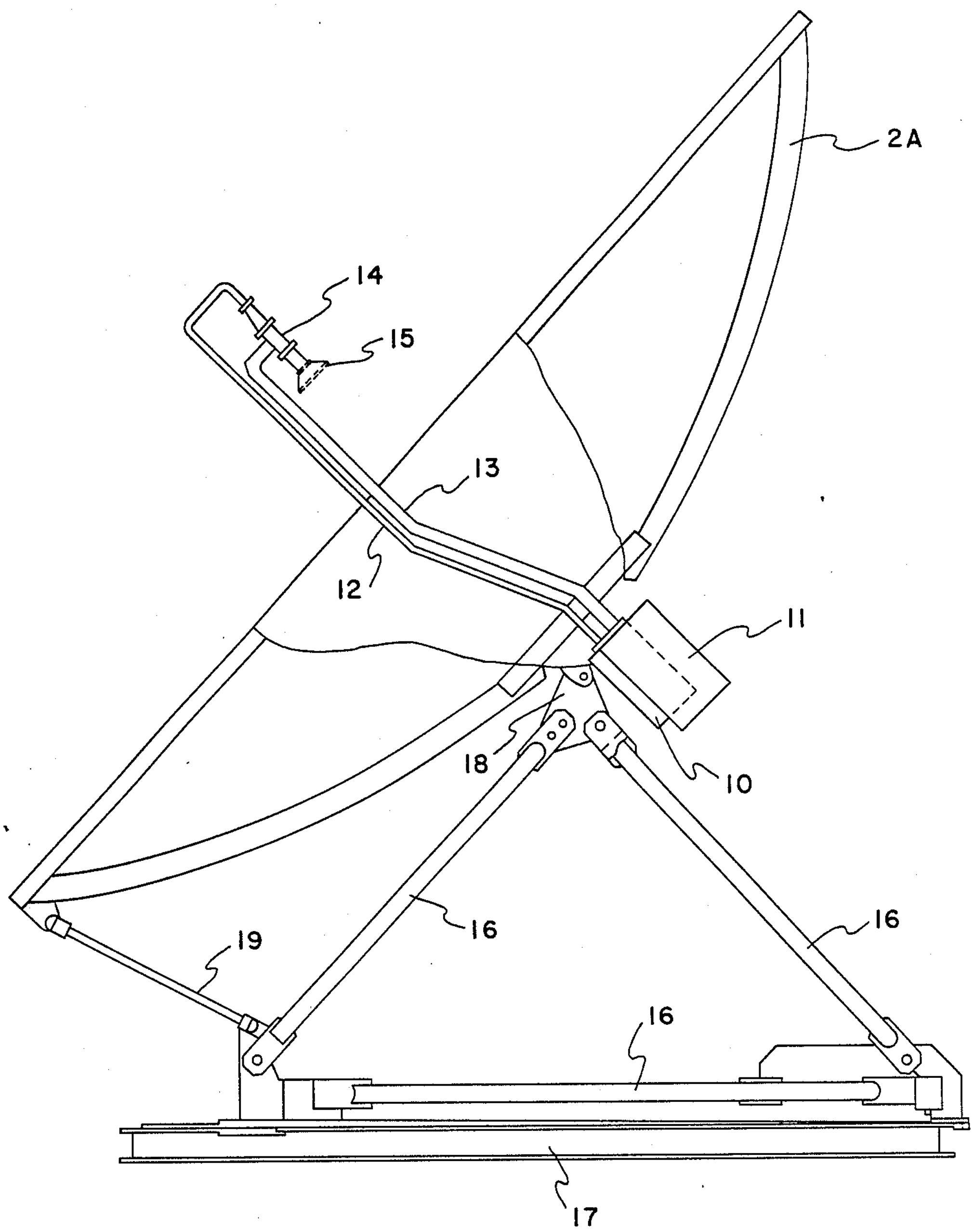
FIG. 1 PRIOR ART
FIG. 1 is a side elevation showing a typical example of a prior art transmitter and receiver having an antenna.

FIG. 1 of the drawings, shows a prior art transmitter and receiver of the kind to which the present invention pertains and includes a transmitter 10 and a receiver 11. As shown, the transmitter 10 and the receiver 11 are situated at the back of a parabolic reflector 2A in order not to block the receive and transmit waves. The transmitter 10 and the receiver 11 are connected to a transmit/receive multiplexer 14 by elongated feeder waveguides 12 and 13, respectively, and further are connected to a primary radiator, or horn, 15. Antenna-mount structural elements 16, 17, 18 and 19 support the transmitter 10 and receiver 11, as illustrated. In this construction, the polarization plane of a polarized wave cannot be aligned with the angle of polarization of the horn 15 unless all of the transmitter 10, receiver 11, waveguides 12 and 13, multiplexer 14 and horn 14 are rotated over an adequate angle about the wave radiation axis. This gives rise to a problem because a complicated and expensive polarization adjusting mechanism is required. In addition, the critical problem is that the waveguide loss is significant.

Figure 2:
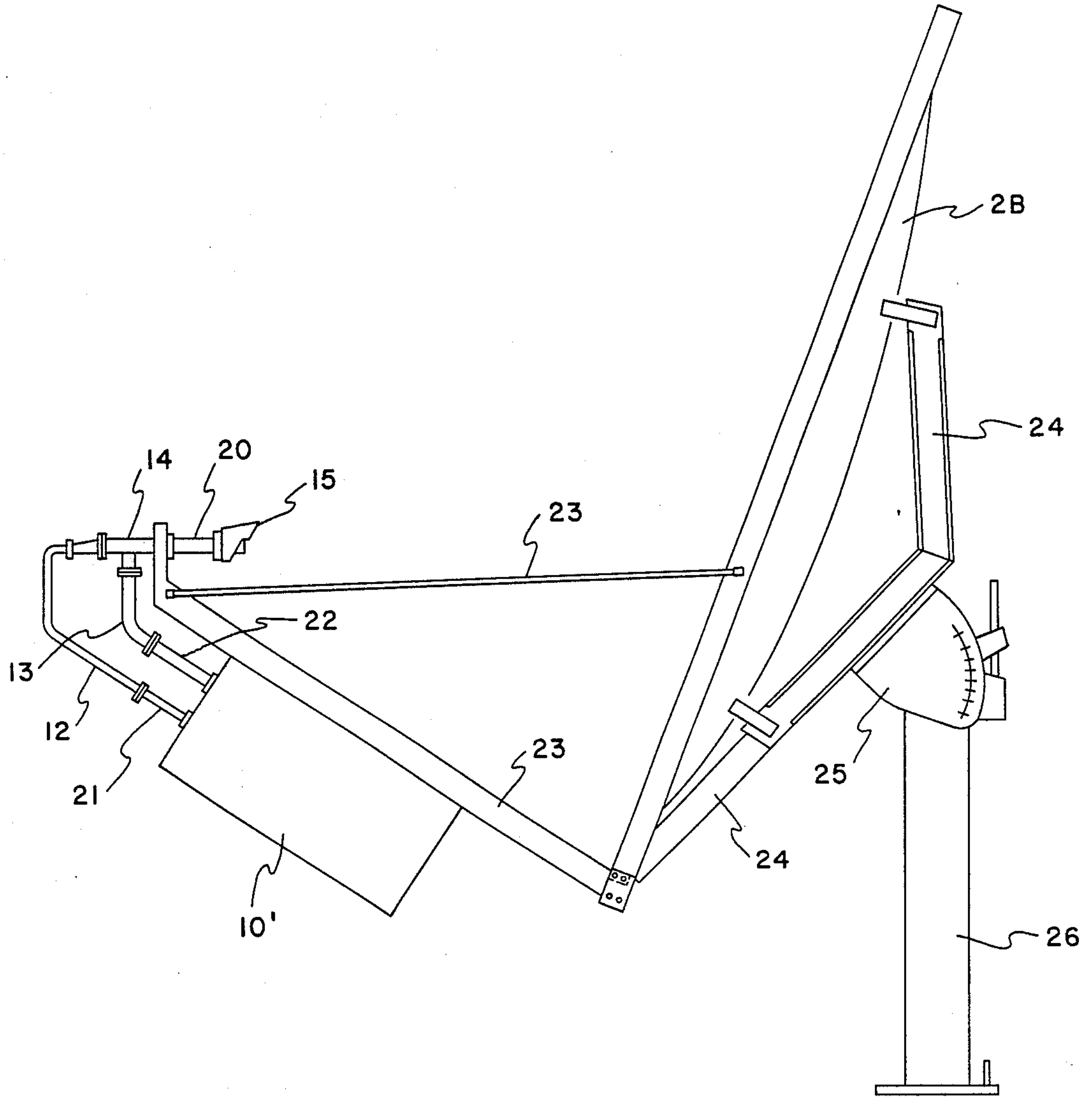
FIG. 2 PRIOR ART.
FIG. 2 is a view similar to FIG. 1, but showing another typical example of the prior art transmitter/-receiver having an antenna.

FIG. 2 shows another prior art transmitter/receiver which uses an offset type parabolic reflector 2B. An outstanding feature of this type of transmitter/receiver is that it can be situated in the vicinity of a primary radiator 15 to reduce feeder loss, to a significant degree. In FIG. 2, designated by the reference numeral 21 is a transmit filter, 22 a receive filter, 12 a transmit feeder, 13 a receive feeder, 14 a transmit/receive multiplexer, and 15 the primary radiator, all of which are interconnected, as illustrated. Support members 23 are adapted to mount the transmitter/receiver 10' and to provide a substantial mechanical strength. The support members 23 also support the primary reflector, or horn 15.

This prior art system successfully reduces feeder loss, but not to a negligible degree. A polarizer 20 is and has to be inserted between the multiplexer 14 and the horn 15, so that the plane of polarization may be rotatable. This type of construction is expensive due to the complicated structure, the considerable dimensions and weight, and the need for a polarizer. Further, the antenna mount structure 24, 25 and 26 are stiff and heavy, and they add to the overall weight and cost of the transmitter/receiver.

As described above, each of the prior art transmitter/receiver combinations, with an antenna, is intricate in construction and expenses, and each needs a time-consuming assembly and adjustment in the event of installation. The construction of FIG. 1, which uses long feeders, suffers from a serious drawback in that the substantial feed loss further increases the required transmitter output and aggravates receiver noise.

Hereinafter will be described a small-size and low-cost transmitter/receiver apparatus in accordance with the present invention, which is free from the above-discussed drawbacks and which is suited for use in a medium to small capacity communication system.

Figure 3:
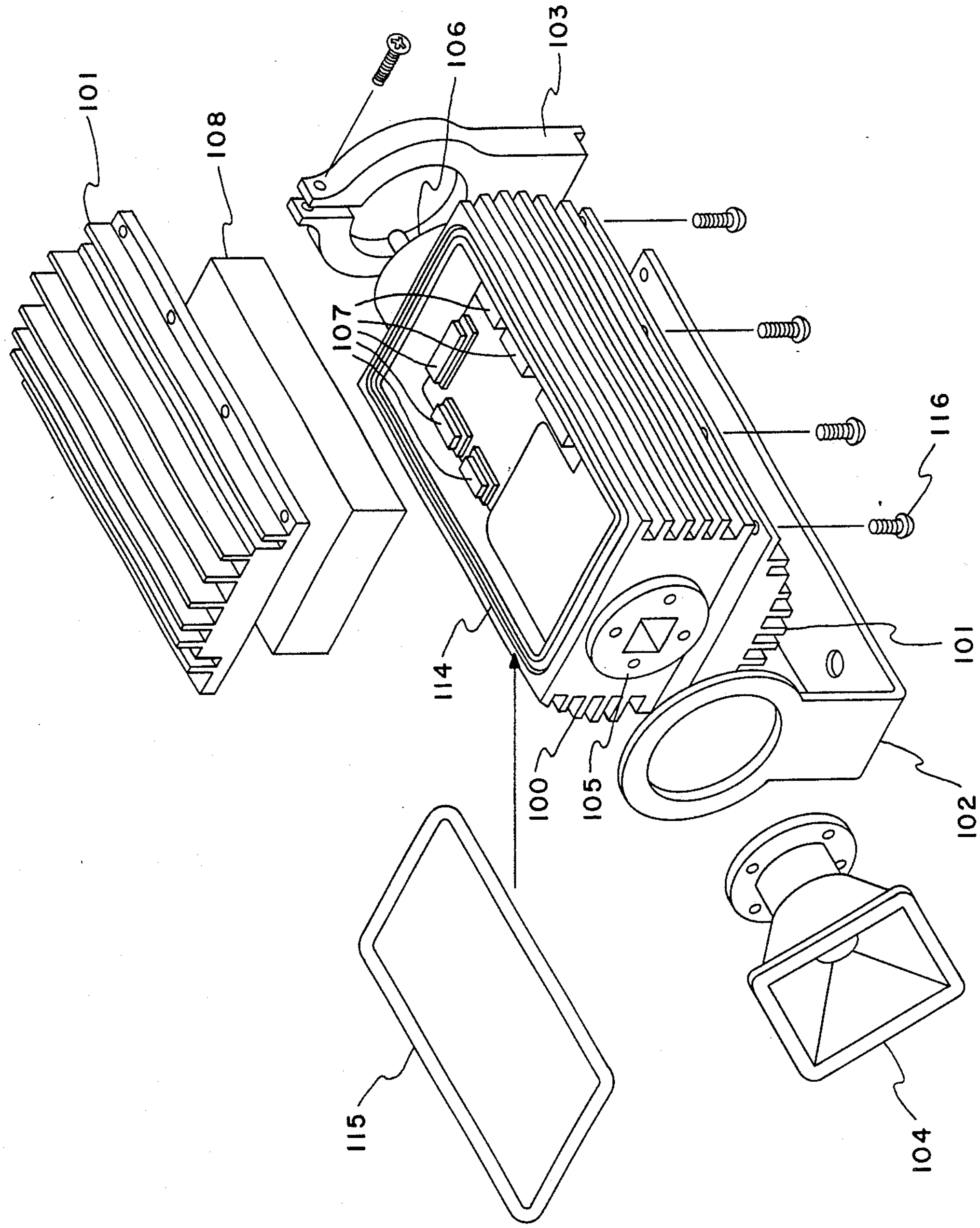
FIG. 3 is an exploded perspective view of the overall structure of a microwave transmitter/receiver apparatus embodying the present invention.

FIG. 3 shows a transmitter/receiver apparatus embodying the present invention in an exploded and perspective view, to best show its characteristic features. The apparatus includes a housing 100 in which a transmit/receive multiplexer, a transmit filter, a receive filter, a transmit circuit, a receive circuit and other equipment are installed. Covers 101 are fastened to the top and the bottom of the housing 100 by screws 116.

To make the apparatus air- and liquid-tight, each O-ring 115 is received in a groove 114 which is formed in the housing 100, as illustrated. On opposite sides of the housing 100, are portions which serve as shafts for rotatably supporting the apparatus, i.e., a front shaft portion 105 and a rear shaft portion 106. The front shaft portion 105 also functions as a horn mounting flange. The rear shaft portions 106 has a connector inside it, which connector dictates the input to and output from the apparatus. Both the front shaft support member 102 and the rear shaft support member 103 are made of metal and are rotatably coupled over the shaft portions 105 and 106, respectively. The rear shaft support member 103 also serves as a mechanism for clamping the rear shaft portion 106 and, thereby, preventing the apparatus from rotating. A primary radiator, or horn 104 is mounted on the flange 105. The reference numeral 107 designates microwave circuit modules which constitute a transmit circuit, a receive circuit and other circuits which are suitably separated on a functional basis. Such circuit modules are produced by hybrid IC technology or monolithic IC technology. Any of these technologies is effective to significantly cut down the dimensions of the transmit and receive circuits. Another circuit 108 includes a local oscillator, an intermediate frequency (IF) amplifier and other built-in circuits.

Figure 4B:
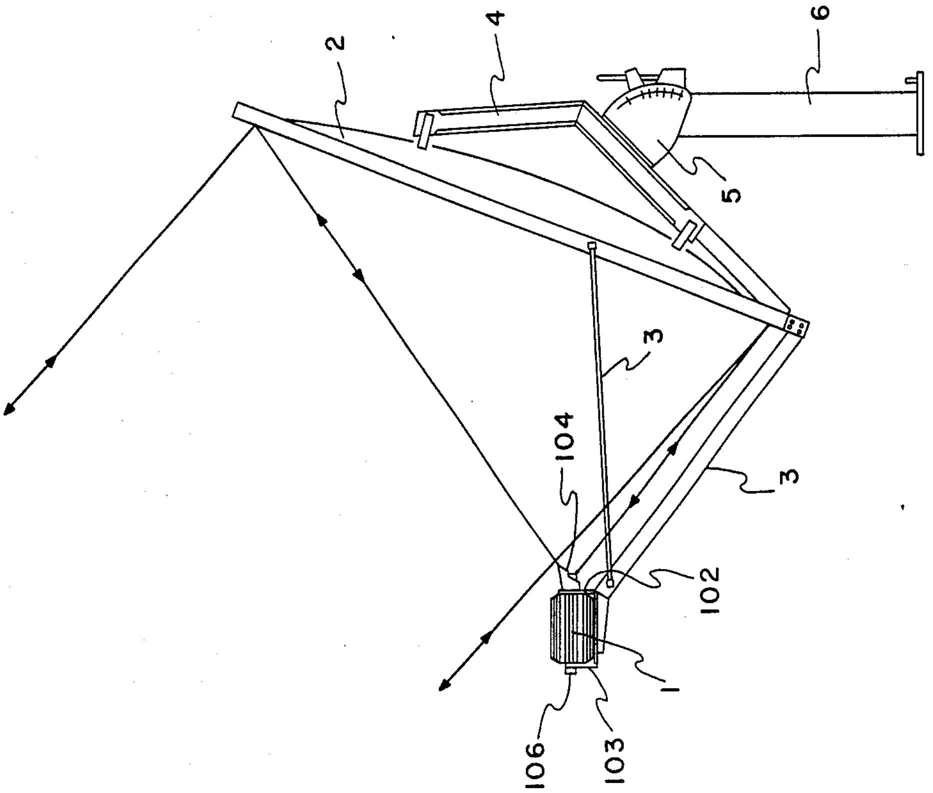
FIGS. 4A and 4B, respectively, are a front view and a side elevation of the transmitter/receiver apparatus in accordance with the present invention which is combined with an antenna.
Figure 4A:
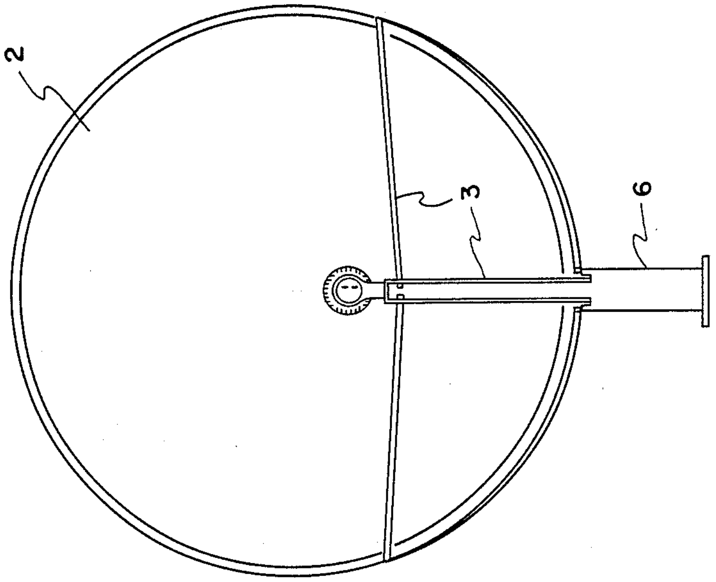

Before entering into a description of a more specific construction of the inventive apparatus, a description of how the apparatus may be used in practice will be given. FIGS. 4A and 4B show an exemplary manner of using the apparatus of the present invention, generally designated by the reference numeral 1. Also shown in FIGS. 4A and 4B are a primary reflector 2 of an antenna, support members 3 for supporting the apparatus 1, a framework 4 for mounting the whole antenna with the apparatus 1, a mechanism 5 for adjusting the elevation of the antenna, and an antenna support post 6. Basically, the illustrative configuration constitutes an offset parabolic antenna. To align the antenna and point it in a direction of wave arrival, the azimuth is adjusted by rotation on the post 6 and by an elevation by the elevation adjusting mechanism 5. Meanwhile, the plane of the polarization of the horn 104 can be matched to the polarization of the wave merely by rotating the whole apparatus 1, which carries the horn 104 integrally therewith. After the horn 104 has reached an adequate angular position, the previously stated clamp mechanism is operated to fix the whole apparatus in place. This completes the adjustment.

As described above, the apparatus of the present invention is characterized in that a horn, a transmit/-receive multiplexer, a transmit and a receive circuit and other circuits are provided in an integral and, therefore, small-size configuration. The entire apparatus is rotatably supported. This remarkably simplifies the entire apparatus structure inclusive of an antenna. The miniature constrution makes it needless to use massive and heavy members for the members 3 which support the apparatus in a predetermined positional relationship with respect to the antenna.

It also eliminates the need for a polarizer which is an expensive functional part otherwise required for a polarization matching purpose. Weather protection may be considerably enhanced by integrating the horn and the multiplxer, and by integrating components other than the horn with the apparatus.

Since there is no waveguide out of the apparatus, only the previously mentioned two O-rings 115 (FIG. 3) are required to give the entire apparatus an air- and liquid-tight structure.

Due to the decrease in the dimensions of the apparatus, undesirable wave blocking is remarkably reduced to allow the apparatus to be positioned adjacent to a reflector, with the result that a majority of the feeder loss is substantially eliminated. The elimination of this loss leads to a decrease in the required output of the transmit amplifier, which in turn, contributes a great deal to the decrease in the power consumption of the apparatus. Since the efficiency of the transmit amplifier is as low as 10%, the decrease in the feeder loss has a significant and desirable effect on the power consumption of the apparatus. Further, as a result of the decrease in the power consumption, the necessary dimensions of heat-radiating fins and, therefore, the dimensions of the whole apparatus are reduced.

The decrease in the feeder loss is reflected by a remarkable decrease in the receiver noise which, in turn, leads to a small-size antenna.

It will be seen from the foregoing that the apparatus of the present invention totally solves the various problems particular to the prior art apparatus.

Figure 5C:
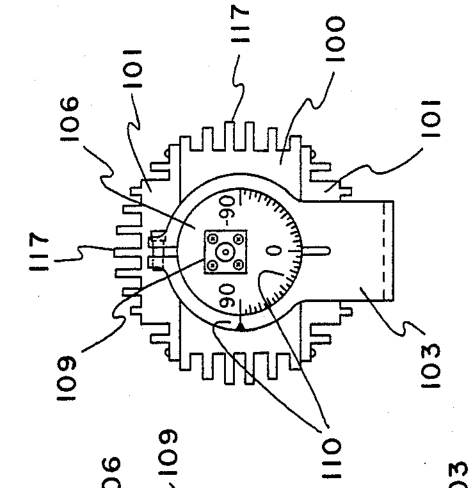
FIGS. 5A, 5B and 5C, respectively, are a side view, a front view and a rear view of the apparatus.
Figure 5A:
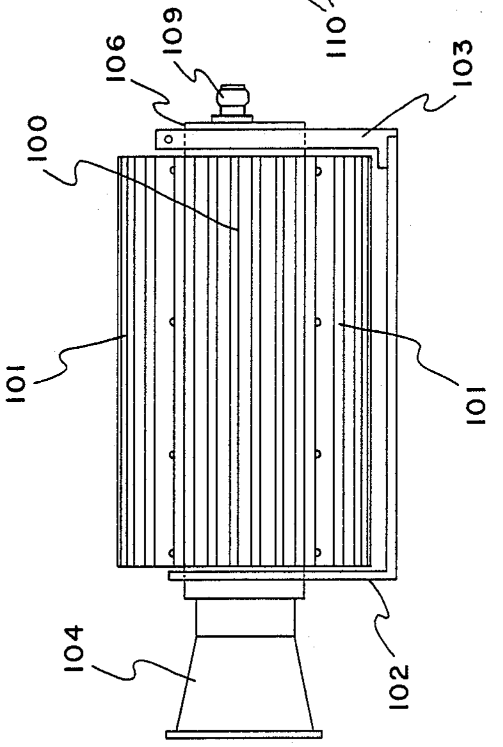
Figure 5B:
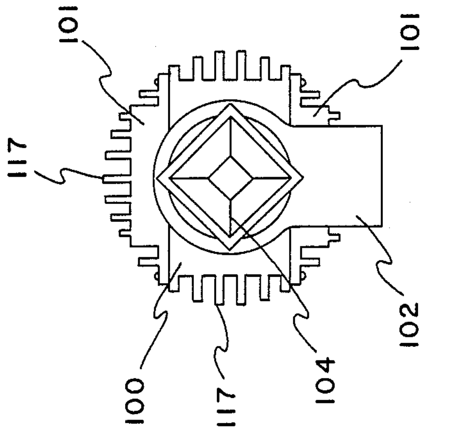

A more specific construction of the apparatus of the present invention will be described. FIGS. 5A–5C show characteristic features of the external appearance of the apparatus. Specifically, FIG. 5A is a side elevation, FIG. 5B a front view as seen from the horn side, and FIG. 5C a rear view.

The housing 100 and the cover 101 are each formed with fins 117 which radiate heat generated by the transmit amplifier and, thereby, suppress a temperature elevation of the apparatus. At one side of the housing 100, the horn 104 is mounted to the flange portion 105 (FIG. 3) which is inside the shaft portion for the housing 100. Also provided on the back of the housing 100 is the shaft portion 106 for enabling the rotation of the housing 100. A single connector 109 is provided on the inward side of the shaft portion 106. This is because, in this particular embodiment, both the transmit and receive IF signals are accommodated by a single coaxial cable and because the power source feeder for the apparatus is also implemented by that cable.

The fins 117 on the housing 100 and cover 101 are distributed over the entire periphery of the apparatus so that the heat radiation ability is not effected even if the apparatus is rotated together with the horn 104. As shown in FIG. 5C, graduations 110 are indicative of angles between the rear shaft 106 and the rear metal support, or bearing 103. Graduations 110 facilitate an adjustment of the polarization angle. Specifically, after the inclination of the whole antenna has been checked, the polarization angle can be readily adjusted with the aid of the graduations 110.

Next, the internal construction of the apparatus will be described.

Figure 6:
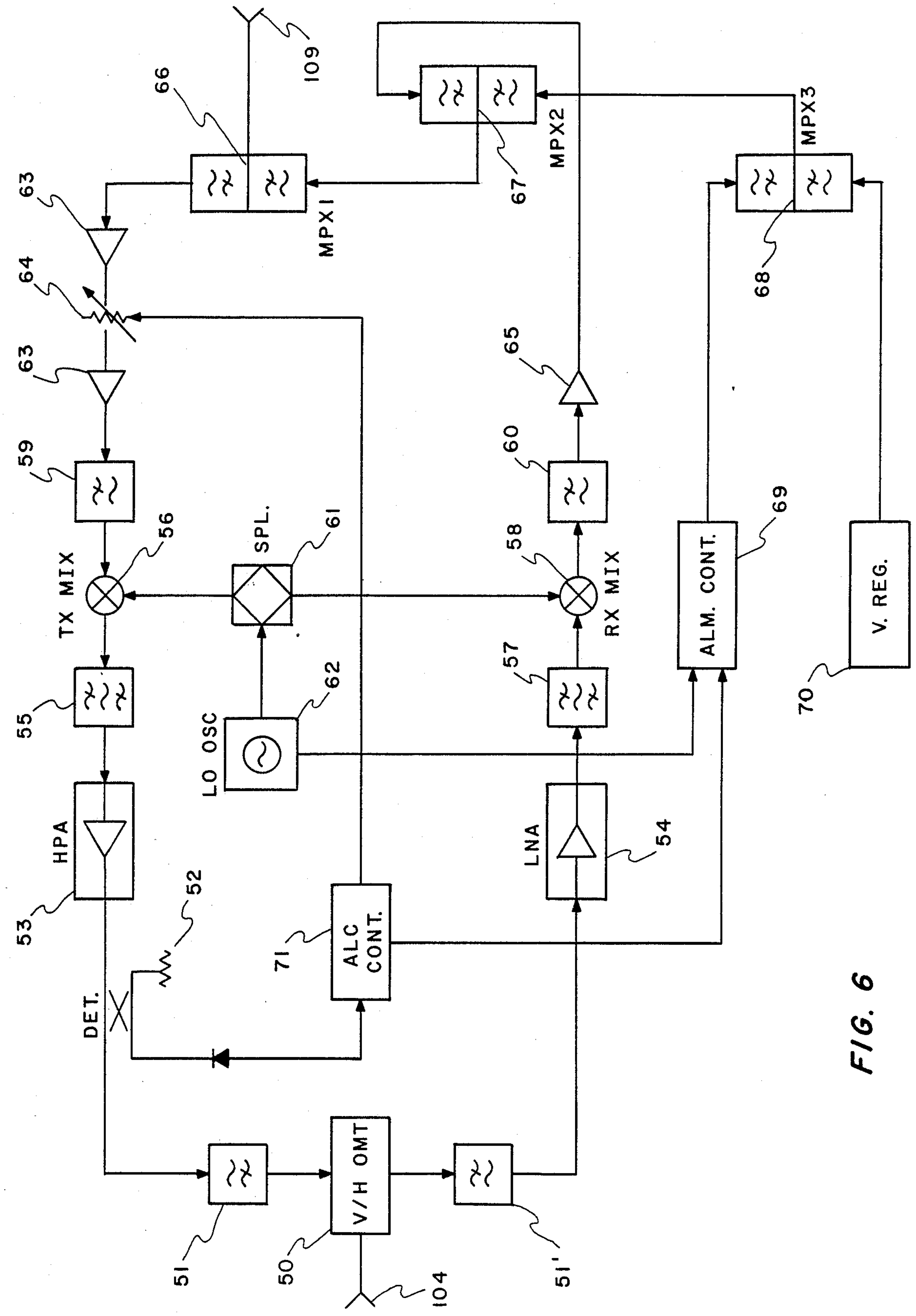
FIG. 6 is a block diagram of the apparatus in accordance with the present invention.

FIG. 6 shows a circuit arrangement which is built in the apparatus. All of the circuit elements are accommodated in the apparatus except for the horn 104 and the input/output connector 109, both of which protrude to the outside. The transmit/receive multiplexer 50 is implemented by an othogonal mode transducer which uses a waveguide having a rectangular cross section. Each of transmit filters 51 and a receive filter 51' have a waveguide structure which is integral with the multiplexer 50.

The transmit side includes a detector 52 which is adapted to detect the levels of the transmit signals, a power amplifier 53, a filter 55 for selecting only transmit RF signals, and a transmit mixer, or transmit frequency converter 56. The receive side, on the other hand, includes a low noise amplifier 54, a receive signal selection filter 57, and a receive mixer, or receive frquency converter 58. The elements described so far constitute a transmit and receive RF circuit, in combination. The power amplifier 53, low noise amplifier 54, transmit and receive mixers 56 and 58, and other circuits are constructed by a use of a hybrid IC technology, while the other components are implemented through a use of waveguide circuit technology.

An output of a local oscillator 62 is routed via a splitter 61 to each of the transmit mixer 56 and the receive mixer 58.

The IF circuit includes IF filters 59 and 60 which respectively are associated with the mixers 56 and 58, a transmit IF amplifier 63, and a variable attenuator 64. The variable attenuator 64 is adapted to control the transmit power to a predetermined value in combination with the previously mentioned detector 52 and under the control of a control circuit 71. Designated by the reference numeral 65 is a receive IF amplifier. A control circuit 69 monitors transmit and receive levels, output power of the local oscillator 62 and other levels and delivers alarm signals to the outside, when any of the levels become unusual. A voltage regulator 70 is adapted to maintain the voltage level applied to the various sections of the circuit constant.

To multiplex the transmit IF signals, receive IF signals, alarm signals, DC power and other signals on a single coaxial cable, the circuitry includes three multiplexers: a multiplexer (MPX3) 68 for separating an alarm signal ALM and a DC current from each other, a multiplexer (MPX2) 67 for separating the receive IF signal and the alarm signal including DC, and a multiplexer (MPX1) 66 for separating the receive IF signal, the transmit IF signal, and the alarm signal including DC. These signals are delivered to and from the apparatus via the connector 109.

Next to be described is how the circuitry is miniaturized and compactly installed in the apparatus. The overall dimensions of an apparatus are chiefly determined by two factors, i.e., a heat radiation structure necessary for effectively radiating heat and a size of an RF circuit.

For an effective radiation of heat, the apparatus of the present invention uses the following structure. Approximately 70% of the heat generated by the apparatus is attributable to the transmit power amplifier 53 (FIG. 6). In accordance with the present invention, the power amplifier 53 is implemented by six to eight consecutive stages of transistor amplification circuits and is configured as several discrete modules 107 (FIGS. 3 or 7).

Figure 8:
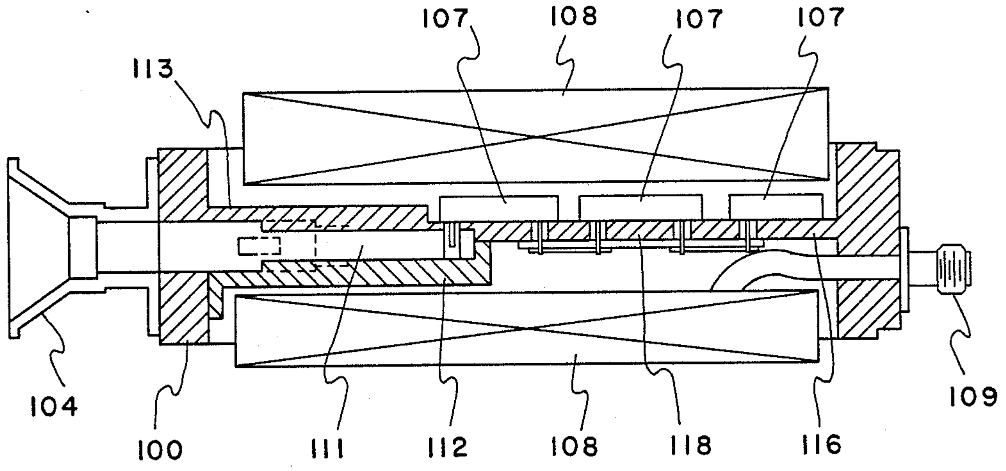
FIG. 8 is a section of the transceiver which is perpendicular to the heat sink and which contains the center axis of the apparatus (taken along line A—A of FIG. 7)

As shown in FIG. 8, the modules are rigidly mounted on heat sink members 112, 113, 116, 118 of the apparatus housing 100. Heat is transferred to the heat sink 118 and then is propagated to the housing 100 and cover 101. From there, the heat is directly released to the outside via the fins 117 by conduction, while being partly released by radiation to adjacent spaces.

Figure 7:
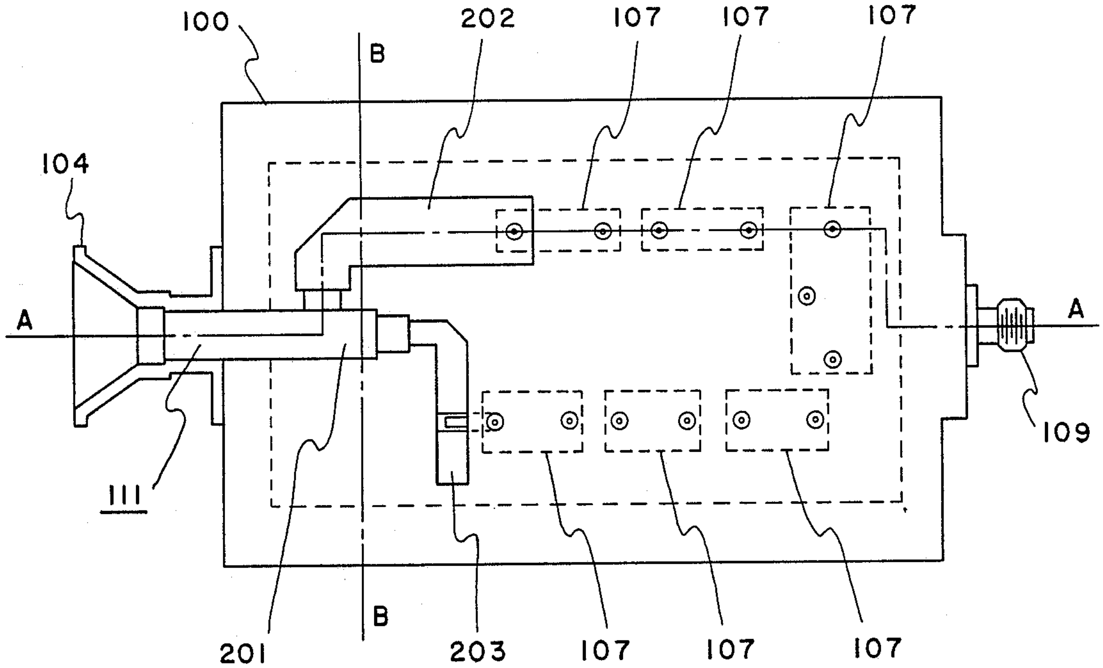
FIG. 7 is a section of the apparatus taken along a plane which is parallel to a central partition plate, or heat sink, of the apparatus and which contains the center axis of the apparatus.
Figure 9:
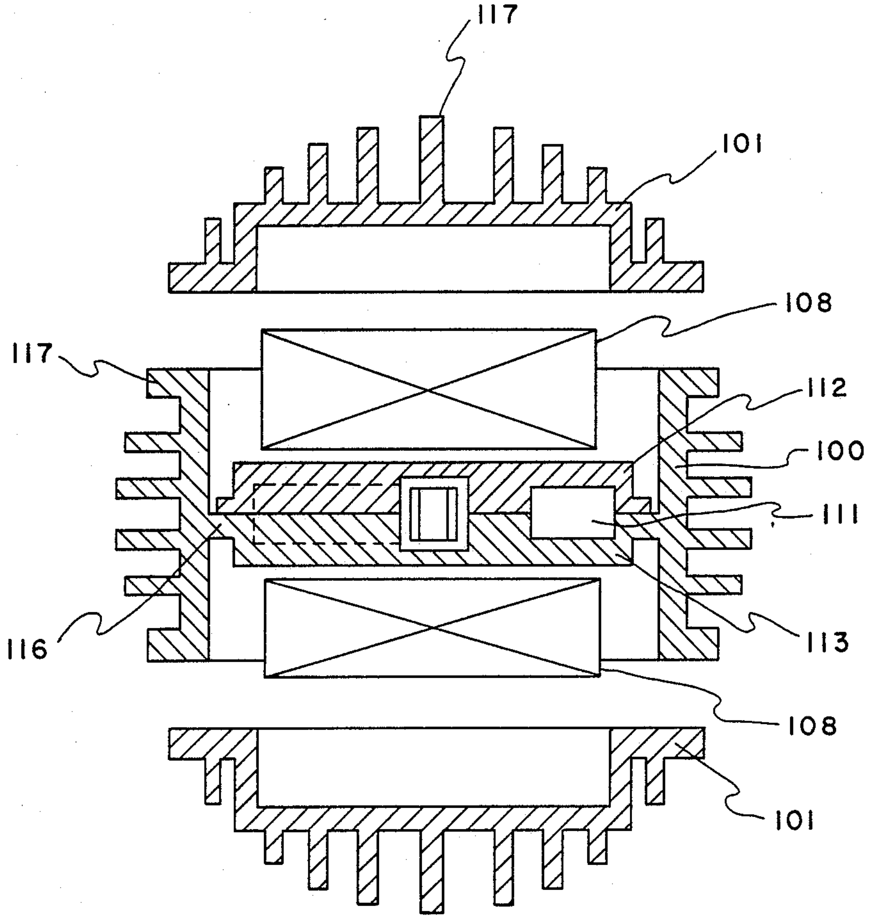
FIG. 9 is a section which is perpendicular to the wave radiation axis (taken along line B—B of FIG. 7).

FIG. 9 is a section taken along a plane which is perpendicular to the wave radiation axis of the apparatus, and shows a section taken along line B—B of FIG. 7. The heat reaching the heat sink 118 (FIG. 8) is propagated directly to the fins 117 on the outer periphery of the housing 100 and on the cover 101. In this manner, the heat radiation structure effectively utilizes the combination of direct conduction and fins, thereby reducing the overall dimensions of the transceiver.

Next to be described is how the RF circuit is reduced in size. FIG. 7 shows the apparatus of the present invention in a section taken along a plane which contains the wave radiation axis (FIG. 5A) 119 and parallel to the heat sink member 116 or 118 (FIG. 8), on which the circuit modules are mounted. FIG. 8 is a section taken along line A—A of FIG. 7.

As previously stated, the RF circuit is made up of a waveguide circuit 111 and the modules 107. The waveguide circuit 111 is formed by a combination of the members 112 and 113 (FIG. 9), 116 and 118 constitute the central partition plate of the housing 100. The central partition plate may be formed as an RF circuit plate independently of the housing 100.

Reducing the dimensions of the functional parts of the RF circuit by means of hybrid IC technology is another major factor which cuts down the size of the apparatus. Specifically, that which contributes a great deal to the miniature apparatus configuration is the fact that the transmit power amplifier 53 (FIG. 6), low noise amplifier 54, transmit mixer 56, receive mixer 58 and other circuits shown in FIG. 6 are miniaturized and, as shown in FIG. 7, installed as function modules 107.

In summary, it will be seen that a microwave transmitter/receiver apparatus of the present invention achieves various advantages, as enumerated below.

(1) The size and, therefore, the cost is reduced. In addition, the need for a polarizer is eliminated to simplify the construction and reduce the weight of an antenna, thereby further promoting the reduction of cost.

(2) The assembly, the adjustment of direction and of the plane of polarization are facilitated to reduce the installation costs.

(3) The feed loss is reduced to substantially zero by the miniaturization and allows the output of a transmit power amplifier to be lowered, still further promoting the miniaturization. The receiver noise is suppressed. This contributes a great deal to the miniaturization of a parabolic reflector, which, in turn, makes a considerable contribution to the reduction of the cost.

Those who are skilled in the art will readily perceive how to modify the invention. Therefore, the appended claims are to be construed to cover all equivalent structures which fall within the true scope and spirit of the invention.

What is claimed is:

1. A microwave transmitter/receiver apparatus comprising:

a housing having a front shaft portion and a rear shaft portion, said housing having a central partition plate;

a primary radiator adapted for wave radiation;

a transmit/receiver multiplexer for multiplexing a transmit signal and a receive signal, said multiplexer having a transmit input and a receive input, at least the transmit/receive multiplexer being a waveguide circuit in the central partition plate of the housing;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

means for accommodating the transmit/receive multiplexer, the transmit and the receive filters, the transmit means and the receive means in the housing;

means for mounting the primary radiator in an opening in the housing; and support means coupled to said front and rear shaft portions for rotatably supporting the housing to turn about a wave radiation axis of the housing support means, thereby controlling the plane of a wave polarization.

2. A microwave transmitter/receiver apparatus comprising:

a housing having a central partition plate;

a primary radiator;

a transmit/receiver multiplexer for multiplexing a transmit signal and a receive signal, said multiplexer having a transmit input and a receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal; receive means connected to the receive filter for outputting a predetermined receive IF signal responsive to receiving the receive signal;

means for accommodating the transmit/receive multiplexer, the transmit and the receive filters, the transmit means and the receive means in the housing;

at least the multiplexer being a waveguide circuit in the central partition plate.

3. A microwave transmitter/receiver apparatus as claimed in claim 2, wherein the transmit and the receive filters are a waveguide circuit in the central partition plate.

4. A microwave transmitter/receiver apparatus as claimed in claim 2, further comprising support means for rotatably supporting the housing to turn about a wave radiation axis of the housing.

5. A microwave transmitter/receiver apparatus as claimed in claim 4, wherein said support means includes means for locking the housing in an angular position.

6. A microwave transmitter/receiver apparatus as claimed in claim 2, wherein the primary radiator has a center axis and is mounted in a front end portion of the housing, said center axis of the primary radiator being aligned with a wave radiation axis of the housing.

7. A microwave transmitter/receiver apparatus as claimed in claim 2, wherein an input/output connector is connected to both the IF signal input of the transmit means and the IF signal output of the receive means, said connector being mounted in a rear end portion of the housing.

8. A microwave transmitter/receiver apparatus as claimed in claim 2, and a plurality of heat radiation fins distributed substantially uniformly on an outer periphery of the housing.

9. A microwave transmitter/receiver apparatus as claimed in claim 2, further comprising a multiplexer for multiplexing the transmit IF signal, the receive IF signal, and a DC power signal.

10. A microwave transmitter/receiver apparatus as claimed in claim 2, wherein the transmit means includes a first mixer for mixing the transmit IF signal with a common local signal to produce the transmit signal and the receive means includes a second mixer for mixing the receive signal with the common local signal to produce the receive IF signal.

11. A microwave transmitter/receiver apparatus comprising:

a housing having a front shaft portion, and a rear shaft portion, said housing having a central partition plate;

a primary radiator;

a transmit/receiver multiplexer for multiplexing a transmit signal and a receive signal, said multiplexer having a transmit input and a receive input, at least the multiplexer being a waveguide circuit in the central partition plate of the housing;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

support means coupled to the front and rear shaft portions for rotatably supporting the housing to enable it to turn about a wave radiation axis of the housing thereby controlling the plane of a wave polarization; and means for accommodating the multiplexer, the transmit and the receive filters, the transmit means and the receive means in the housing.

12. A microwave transmitter/receiver apparatus comprising:

a housing having a front shaft portion, and a rear shaft portion, said housing having a central partition plate;

a primary radiator;

a transmit/receiver multiplexer for multiplexing a transmit signal and a receive signal, said multiplexer having a transmit input and a receive input;

a transmit filter and a receive filter connected respectively to said transmit input and said receive input of said transmit/receive multiplexer, the multiplexer and the transmit and the receive filters being a waveguide circuit in the central partition plate of the housing;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

support means coupled to the front and rear shaft portions for rotatably supporting the housing to enable it to turn about a wave radiation axis of the housing thereby controlling the plane of a wave polarization; and means for accommodating the multiplexer, the transmit and the receive filters, the transmit means and the receive means in the housing.

13. A microwave transmitter/receiver apparatus comprising:

a housing having a central partition plate;

a primary radiator adapted for wave radiation;

a transmit/receiver multiplexer for multiplexing a transmit signal and a receive signal, said multiplexer having a transmit input and a receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal; and receive means connected to the receive filter for outputting a predetermined receive IF signal responsive to receiving the receive signal;

means for accommodating the transmit/receive multiplexer, the transmit and the receive filters, the transmit means and the receive means in the housing; and means for mounting the primary radiator in an opening in the housing, wherein at least the transmit/receive multiplexer is a wave guide circuit in the central partition plate of the housing.

14. A microwave transmitter/receiver apparatus as claimed in claim 13, further comprising support means for rotatably supporting the housing to turn about a wave radiation axis of the housing.

15. A microwave transmitter/receiver apparatus as claimed in claim 13, wherein the housing has a front shaft portion including the opening and a rear shaft portion.

16. A microwave transmitter/receiver apparatus as claimed in claim 15, wherein the rear shaft portion is provided with an input/output connector connected to both the IF signal input of the transmit means and the IF signal output of the receive means.

17. A microwave transmitter/receiver apparatus as claimed in claim 15, further comprising support means coupled to the front and rear shaft portions for rotatably supporting the housing to turn about a wave radiation axis of the housing, thereby changing the plane of a wave polarization.

18. A microwave transmitter/receiver apparatus as claimed in claim 17, wherein the support means includes means for locking the housing in an angular position.

19. A microwave transmitter/receiver apparatus as claimed in claim 13, further comprising a multiplexer for multiplexing the transmit IF signal, the receive IF signal, and a DC power signal.

20. A microwave transmitter/receiver apparatus as claimed in claim 13, wherein the transmit means includes a first mixer for mixing the transmit IF signal with a common local signal to produce the transmit signal, and the receive means includes a second mixer for mixing the receive signal with the common local signal to produce the receive IF signal.

21. A microwave transmitter/receiver apparatus comprising:

a housing having a front shaft portion and a rear shaft portion;

a primary radiator adapted for wave radiation;

a transmit/receiver multiplexer for multiplexing a transmit signal and a receive signal, said multiplexer having a transmit input and a receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

means for accommodating the transmit/receive multiplexer, the transmit and the receive filters, the transmit means and the receive means in the housing;

means for mounting the primary radiator in an opening in the housing;

support means coupled to said front and rear shaft portions for rotatably supporting the housing to turn about a wave radiation axis of the housing support means, thereby controlling the plane of a wave polarization; and a multiplexer for multiplexing the transmit IF signal, the receive IF signal, and a DC power signal on a single coaxial cable.

22. A microwave transmitter/receiver apparatus comprising:

a housing having a front shaft portion, and a rear shaft portion;

a primary radiator;

a transmit/receiver multiplexer for multiplexing a transmit signal and a receive signal, said multiplexer having a transmit input and a receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

support means coupled to the front and rear shaft portions for rotatably supporting the housing to enable it to turn about a wave radiation axis of the housing thereby controlling the plane of a wave polarization;

means for accommodating the multiplexer, the transmit and the receive filters, the transmit means and the receive means in the housing; and a multiplexer means for multiplexing the transmit IF signal, the receive IF signal, and a DC power signal.

23. A microwave transmitter/receiver apparatus comprising:

a housing having a central partition plate;

a primary radiator;

a transmit/receiver multiplexer for multiplexing a transmit signal and a receive signal, said multiplexer having a transmit input and a receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

support means for rotatably supporting the housing to enable it to turn about a wave radiation axis of the housing; and means for accommodating the multiplexer, the transmit and the receive filters, the transmit means and the receive means in the housing, whereby at least the multiplexer is a waveguide circuit in the central partition of the housing.

24. A microwave transmitter/receiver apparatus as claimed in claim 23, wherein the transmit means includes a first mixer for mixing the transmit IF signal with a common local signal to produce the transmit signal, and the receive means includes a second mixer for mixing the receive signal with the common local signal to produce the receive IF signal 25. A microwave transmitter/receiver apparatus comprising:

a housing;

a primary radiator;

a first transmit/receiver multiplexer for multiplexing a transmit signal and a receive signal, said multiplexer having a transmit input and receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

means for accommodating the transmit/receive multiplexer, the transmit and the receive filters, the transmit means and the receive means in the housing;

a second multiplexer for multiplexing the transmit IF signal, the receive IF signal, and a DC power signal on a single coaxial cable;

at least the first multiplexer being a waveguide circuit in the housing; and support means for rotatably supporting the housing to turn about a wave radiation axis of the housing.

26. A microwave transmitter/receiver apparatus as claimed in claim 25, wherein said support means includes means for locking the housing in an angular position.

27. A microwave transmitter/receiver apparatus comprising:

a housing;

a primary radiator, the primary radiator having a center axis and being mounted in a front end portion of the housing, said center axis of the primary radiator being aligned with a wave radiation axis of the housing;

a first transmit/receiver multiplexer for multiplexing a transmit signal and a receive signal, said multiplexer having a transmit input and receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

means for accommodating the transmit/receive multiplexer, the transmit and the receive filters, the transmit means and the receive means in the housing;

a second multiplexer for multiplexing the transmit IF signal, the receive IF signal, and a DC power signal on a single coaxial cable;

at least the first multiplexer being a waveguide circuit in the housing.

28. A microwave transmitter/receiver apparatus comprising:

a housing;

a primary radiator;

a first transmit/receiver multiplexer for multiplexing a transmit signal and a receive signal, said multiplexer having a transmit input and receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

means for accommodating the transmit/receive multiplexer, the transmit and the receive filters, the transmit means and the receive means in the housing;

a second multiplexer for multiplexing the transmit IF signal, the receive IF signal, and a DC power signal on a single coaxial cable;

at least the first multiplexer being a waveguide circuit in the housing; and an input/output connector connected to both the transmit IF signal input of the transmit means and the receive IF signal output of the receive means, said connector being mounted in a rear end portion of the housing.

29. A microwave transmitter/receiver apparatus comprising:

a housing, a plurality of heat radiating fins distributed substantially uniformly on an outer periphery of the housing;

a primary radiator;

a first transmit/receiver multiplexer for multiplexing a transmit signal and a receive signal, said multiplexer having a transmit input and receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

means for accommodating the transmit/receive multiplexer, the transmit and the receive filters, the transmit means and the receive means in the housing;

a second multiplexer for multiplexing the transmit IF signal, the receive IF signal, and a DC power signal on a single coaxial cable;

at least the first multiplexer being a waveguide circuit in the housing.

30. A microwave transmitter/receiver apparatus comprising:

a housing, said housing having a central partition plate;

a primary radiator;

a transmit/receiver first multiplexer for multiplexing a transmit signal and a receive signal, said multiplexer having a transmit input and a receive input, at least the first multiplexer being a waveguide circuit in the central partition plate of the housing;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

support means for rotatably supporting the housing to enable it to turn about a wave radiation axis of the housing for controlling the plane of a wave polarization.

31. A microwave transmitter/receiver apparatus comprising:

a housing, said housing having a central partition plate;

a primary radiator;

a transmit/receiver first multiplexer for multiplexing a transmit signal and a receive signal, said multiplexer having a transmit input and a receive input;

a transmit filter and a receive filter connected respectively to said transmit input and said receive input of said transmit/receive multiplexer;

transmit means connected to said transmit filter for outputting the transmit signal responsive to receiving a predetermined transmit intermediate frequency (IF) signal;

receive means connected to the receive filter for outputting a predetermined receive IF signal responsive to receiving the receive signal;

support means for rotatably supporting the housing and the apparatus exclusive of the support means to enable them to turn about a wave radiation axis of the housing for controlling the plane of a wave polarization.

* * * * *